United States Patent Office 3,328,474
Patented June 27, 1967

3,328,474
STABILIZED METHYL CHLOROFORM
COMPOSITIONS
Milton J. Blankenship, Midland, Mich., assignor to The Dow Chemical Company, Midland, Mich., a corporation of Delaware
No Drawing. Filed May 13, 1964, Ser. No. 367,208
5 Claims. (Cl. 260—652.5)

This invention relates to stabilized methyl chloroform compositions and to the preparation of such compositions. More particularly, the present invention relates to methyl chloroform compositions which contain inhibiting amounts of oxygen-containing N-substituted saturated aziridinyl compounds.

It is known that N-isopropylallenimine will inhibit various chlorinated aliphatic hydrocarbons against oxidative deterioration as disclosed by Watson et al. in U.S. Patent 2,878,297. Such compositions, however, have certain disadvantages due to the presence of an active methylene group in the allenimine molecule and tend to cause decolorization of certain metals and alloys (such as brass). British Patent 912,118 suggests the use of broad classes of imine compounds as stabilizers for methyl chloroform. These compounds, however, do not have an oxygen atom in the substituent which is attached to the nitrogen atom and tend to polymerize readily.

It has now been found that methyl chloroform can be stabilized against attack by metals and alloys (such as aluminum and bronze) without causing undesirable metal stains and without undue polymerization of the inhibitor by contact with saturated aziridinyl compounds wherein the total number of substituents on the aziridine ring contain no more than six carbon atoms and which have the formula

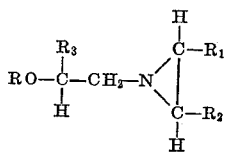

wherein each of $R_1$, $R_2$ and $R_3$ is a hydrogen atom or an alkyl group of from 1 to 6 carbon atoms (for example, methyl, ethyl, n-propyl, i-propyl, n-butyl, i-butyl, sec.-butyl and isomeric $C_5$ and $C_6$ alkyl groups such as n-pentyl, i-pentyl, n-hexyl and i-hexyl) and R may be H or the group

wherein $R_4$ is an alkyl group of from 1 to 3 carbon atoms (methyl, ethyl, n-propyl or i-propyl).

N-alkyl substituted aziridines are known compounds. Aziridine compounds which contain a hydroxyl group attached to the heterocyclic N-substituent may be prepared by the reaction of an aziridinyl compound in which the nitrogen atom is unsubstituted with an appropriate alkylene oxide according to known methods. These N-substituted aziridinyl alkanols.

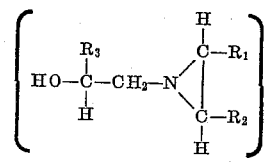

may be reacted with a carboxylic acid containing from 1 to 4 carbon atoms to form the corresponding esters, as disclosed in copending U.S. application Ser. No. 309,865, filed Sept. 18, 1963. Typical acids which may be used include acetic, propionic and butyric acids.

The N-substituted aziridinyl compounds may be incorporated into the methyl chloroform to provide an inhibited composition containing up to about 15 percent by weight of the aziridinyl compound based upon the total weight of the composition. Only an inhibiting amount of saturated aziridinyl compound is necessary and amounts of from 1 to 10 percent by weight may be employed. With the more active inhibitors (total of 2 to 4 carbon atoms in the ring substituents), amounts of from about 2 to 6 percent by weight (based upon the total weight of the composition) give excellent results. The stabilizing compounds of this invention may be used in combination with other conventional additives (anti-oxidants, etc.).

The inhibited methyl chloroform compositions are especially useful for critical metal degreasing operations where the physical appearance as well as the chemical cleanliness of the metal object is important.

Representative inhibitor compounds include 1-aziridineethanol, α-methyl 1-aziridineethanol, α-ethyl 1-aziridineethanol, α-i-propyl 1-aziridineethanol and the esters of these alcohols and any of the lower carboxylic acids such as acetic acid, propionic acid or the isomeric butyric acids.

The following examples are submitted for the purpose of illustration only and are not to be construed as limiting the scope of the invention in any way.

*Examples I and II.—General procedure*

Amounts of each of the indicated saturated aziridine compounds sufficient to give the concentrations indicated in Table 1 were added to 10 milliliter samples of uninhibited methyl chloroform. A 2½" x ½" piece of 18 gauge (0.048" approximate thickness) aluminum (1100 alloy—an alloy composed of a minimum of 99.0 percent by weight aluminum with a maximum of 1 percent combined silicon and iron) was immersed in the test composition and scratched while submerged in the fluid. Table 1 summarizes the results obtained. In all cases, an immediate and violent reaction occurred when the aluminum coupon was scratched while immersed in uninhibited methyl chloroform.

TABLE 1

| Example Number | Inhibitor Compound | Concentration [1] | Result |
| --- | --- | --- | --- |
| I | α-methyl 1-aziridineethanol 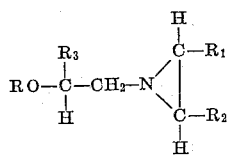 | 0.75 | Reaction slowed. |
| | | [2] 4.0 | No reaction. |
| II | 2-(1-aziridinyl)ethyl acetate 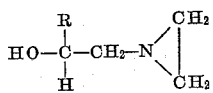 | 1.0 | Reaction slowed. |
| | | [2] 4.0 | No reaction. |

[1] $\dfrac{\text{Wt. of Inhibitor}}{\text{Total Wt. of Composition}} \times 100.$

[2] In a manner similar to each of Examples I and II but using a 4.5 percent by weight concentration of each inhibitor compound, the decomposition reaction was also prevented. The results obtained were no better than with lower concentrations employed in Examples I and II.

I claim as my invention:

1. A stabilized methyl chloroform composition containing an inhibiting amount of a compound of the formula

wherein:
(a) each of $R_1$, $R_2$ and $R_3$ is a group of the formula $(C_kH_{2k})H$ in which $k$ is an integer from 0 to 6, and
(b) R is selected from the group consisting of the hydrogen atom and the group $$(R_4-\overset{\overset{O}{\|}}{C}-)$$

wherein $R_4$ is an alkyl group of from 1 to 3 carbon atoms.

2. A stabilized methyl chloroform composition containing an inhibiting amount up to 15 percent by weight of a compound of the formula

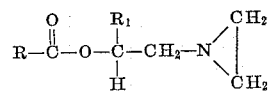

wherein R is an alkyl group of from 1 to 4 carbon atoms.

3. A stabilized methyl chloroform composition containing an inhibiting amount up to 15 percent by weight of a compound of the formula $$R-\overset{\overset{O}{\|}}{C}-O-\overset{\overset{R_1}{|}}{\underset{\underset{H}{|}}{C}}-CH_2-N\diagup^{CH_2}_{CH_2}$$

wherein R is an alkyl group of from 1 to 3 carbon atoms and $R_1$ is the group $(C_kH_{2k})H$ in which $k$ is an integer of 0 to 4.

4. A stabilized methyl chloroform composition containing an inhibiting amount up to 15 percent by weight of α-methyl 1-aziridineethanol.

5. A stabilized methyl chloroform composition containing an inhibiting amount up to 15 percent by weight of 2-(1-aziridinyl)-ethyl acetate.

References Cited

UNITED STATES PATENTS 2,302,362   12/1942   Nelles et al. _____ 260—652.5 X

FOREIGN PATENTS 1,144,702   7/1963   Germany.

LEON ZITVER, *Primary Examiner.*
BERNARD HELFIN, *Examiner.*
M. JACOB, *Assistant Examiner.*